No. 817,922. PATENTED APR. 17, 1906.
J. v. KOROKNAY.
UNIVERSAL JOINT.
APPLICATION FILED JULY 1, 1905.
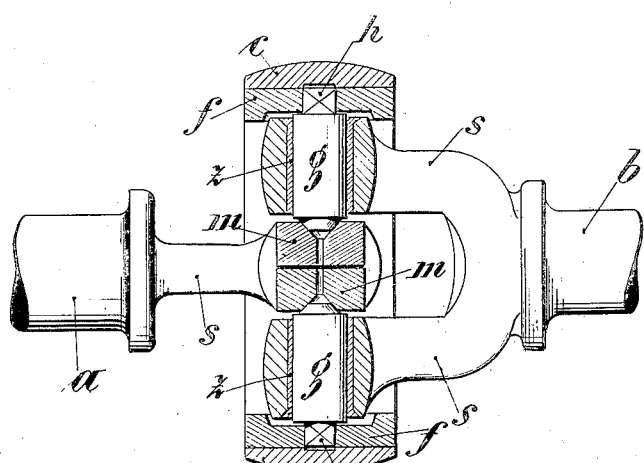
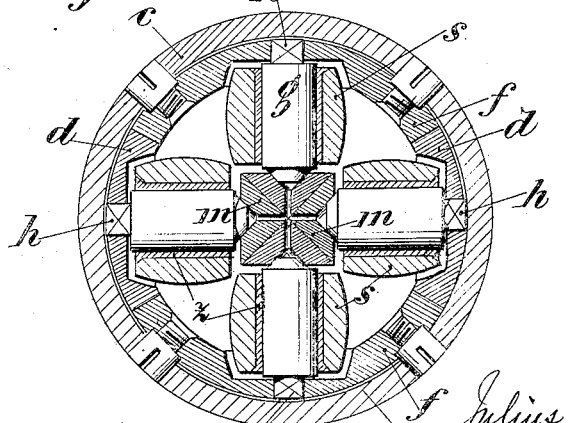
Witnesses.
Inventor:
Julius v. Koroknay
By Wm. E. Boulter,
attorney

UNITED STATES PATENT OFFICE.

JULIUS v. KOROKNAY, OF RAAB, AUSTRIA-HUNGARY.

UNIVERSAL JOINT.

No. 817,922.

Specification of Letters Patent.

Patented April 17, 1906.

Application filed July 1, 1905. Serial No. 267,895.

*To all whom it may concern:*

Be it known that I, JULIUS V. KOROKNAY, engineer, a citizen of the Kingdom of Austria-Hungary, residing at Raab, Austria-Hungary, have invented certain new and useful Improvements in Universal Joints for Motor-Vehicles, of which the following is a specification, reference being had therein to the accompanying drawings.

This invention has for its object improvements in universal joints employed in motor-vehicles for mounting the steering-wheels.

When a universal joint has been in use for a long time, it is found that owing to the very considerable strain, but especially as a result of the friction arising in the shoes for the pins, these latter wear comparatively quickly, as hitherto these joint-pins have been made in one piece with the lengths of shaft. When it is necessary to change or renew the pins, it is also necessary to renew the much more costly lengths of shaft.

The present invention relates to a particular constructional form in accordance with which the joint-pins are mounted rotatably and interchangeably in the ends of the arms of the forks.

In Figures 1 and 2 of the accompanying drawing two sections, at right angles to each other, of the novel form of universal joint are illustrated.

As shown in the figures, the forks $s$, provided at the extremities of the length of shaft $a\ b$, are bored, and these bores are lined with bushes $z$, of crucible steel. In these bushes are placed the pins $g$, which are likewise formed of hardened crucible steel, their outwardly-directed ends being formed square at $h$, and these square portions enter rectangular recesses in the corresponding segments $f\ d$, of which the segments $f$ are immovably fixed to the ring $c$, while the segments $d$ are displaceable in the direction of the longitudinal axis of the ring $c$. The pins are arranged radially of the shafts, as shown. The inwardly-directed ends of the joint-pins $g$ are turned conically and each of them engages in a conically-bored shoe $m$, which presents externally the form of a triangular prism, the base of which is formed by a right-angled isosceles triangle, so that all four shoes $m$, which slide loosely one upon the other, form a prism of square cross-section. Owing to this construction each pin $g$ is maintained in place in a readily interchangeable manner, and the shoes $m$, belonging to the displaceable pins, may be displaced according to requirements relavetily to those belonging to the fixed pins.

It will of course be understood that the form of the shoes $m$ may vary, the essential point being only that each of them should present upon its outer side a recess for the reception of the pin and that all the shoes should be displaceable relatively to each other and mutually support each other.

What I claim is—

In a device of the character described, the combination with the shafts having forked ends, of joint-pins carried by the forks and arranged radially of the shafts and having conical inner ends, and prism-shaped shoes arranged relatively to each other as described, said shoes having a bearing upon and being movable with respect to each other as set forth, and each shoe being provided with a conical seat receiving the conical end of a joint-pin.

In testimony whereof I hereunto affix my signature in presence of two witnesses.

JULIUS v. KOROKNAY.

Witnesses:
FRIEDRICH BINDER,
ALVESTO S. HOGUE.